US011356275B2

(12) United States Patent
Valdez et al.

(10) Patent No.: US 11,356,275 B2
(45) Date of Patent: Jun. 7, 2022

(54) ELECTRONICALLY VERIFYING A PROCESS FLOW

(71) Applicant: International Business Machines Corporation, Armonk, NY (US)

(72) Inventors: Enriquillo Valdez, Queens, NY (US);
Richard H. Boivie, Monroe, CT (US);
Venkata Sitaramagiridharganesh Ganapavarapu, Peekskill, NY (US);
Jinwook Jung, White Plains, NY (US);
Gi-Joon Nam, Chappaqua, NY (US);
Roman Vaculin, Larchmont, NY (US);
James Thomas Rayfield, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/884,623

(22) Filed: May 27, 2020

(65) Prior Publication Data
US 2021/0377042 A1 Dec. 2, 2021

(51) Int. Cl.
*H04L 9/40* (2022.01)
*H04L 9/32* (2006.01)
*G06F 30/398* (2020.01)
*G06F 21/62* (2013.01)
*G06K 9/62* (2022.01)
(Continued)

(52) U.S. Cl.
CPC ........ *H04L 9/3247* (2013.01); *G06F 21/6218* (2013.01); *G06F 30/398* (2020.01); *G06K 9/6256* (2013.01); *G06N 3/02* (2013.01); *H04L 9/0637* (2013.01); *H04L 2209/38* (2013.01)

(58) Field of Classification Search
CPC . H04L 9/3247; H04L 9/0637; H04L 2209/38; G06F 30/398; G06F 21/6218; G06K 9/6256; G06N 3/02
See application file for complete search history.

(56) References Cited

U.S. PATENT DOCUMENTS

| 9,590,635 B1* | 3/2017 | Sengupta | H03K 19/17744 |
| 2003/0069660 A1* | 4/2003 | Jun | G05B 19/4184 700/110 |

(Continued)

FOREIGN PATENT DOCUMENTS

| CN | 108734483 A | 11/2018 |
| CN | 109934019 A | 6/2019 |

OTHER PUBLICATIONS

European Patent Office, International Search Report of PCT/EP2021/057379, dated Sep. 2, 2021.

(Continued)

*Primary Examiner* — Ghodrat Jamshidi
(74) *Attorney, Agent, or Firm* — Law Office of Jim Boice

(57) ABSTRACT

A method verifies an authenticity, integrity, and provenance of outputs from steps in a process flow. One or more processor(s) validate one or more inputs to each step in a process flow by verifying at least one of a hash and a digital signature of each of the one or more inputs. The processor(s) then generate digital signatures that cover outputs of each step and the one or more inputs to each step, such that the digital signatures result in a chain of digital signatures that are used to verify an authenticity, an integrity and a provenance of outputs of the one or more steps in the process flow.

18 Claims, 10 Drawing Sheets

(51) Int. Cl.
*G06N 3/02* (2006.01)
*H04L 9/06* (2006.01)

(56) References Cited

U.S. PATENT DOCUMENTS

| | | | | |
|---|---|---|---|---|
| 2006/0288220 | A1* | 12/2006 | Pennington | H04L 63/02 |
| | | | | 713/176 |
| 2007/0160814 | A1* | 7/2007 | Mercolino | G09F 3/00 |
| | | | | 428/195.1 |
| 2007/0294738 | A1* | 12/2007 | Kuo | H04N 21/4263 |
| | | | | 725/116 |
| 2008/0155406 | A1* | 6/2008 | Naka | G06F 8/38 |
| | | | | 715/700 |
| 2012/0215694 | A1* | 8/2012 | Vilmos | G06Q 20/385 |
| | | | | 705/44 |
| 2013/0231967 | A1* | 9/2013 | Jesionowski | G06Q 10/00 |
| | | | | 705/7.11 |
| 2014/0138435 | A1* | 5/2014 | Khalid | G06Q 20/227 |
| | | | | 235/380 |
| 2017/0213544 | A1* | 7/2017 | Dhoolia | G06F 40/258 |
| 2018/0012311 | A1* | 1/2018 | Small | B22F 10/39 |
| 2018/0017958 | A1* | 1/2018 | Kinoshita | G05B 19/41865 |
| 2018/0082043 | A1 | 3/2018 | Witchey et al. | |
| 2020/0007581 | A1* | 1/2020 | Vouk | H04L 63/20 |
| 2021/0263746 | A1* | 8/2021 | Thom | G06F 3/0604 |
| 2021/0367784 | A1* | 11/2021 | Gao | H04L 63/08 |
| 2021/0377219 | A1* | 12/2021 | Finchelstein | H04L 9/3247 |

OTHER PUBLICATIONS

Watanabe et al., "A Novel Chip-Level Blockchain Security Soluction for the Internet of Things Network", Technologies 2019.
Mell et al, "The NIST Definition of Cloud Computing", NIST Special Publication 800-145, Sep. 2011.

* cited by examiner

| 402 | 404 | 406 | 408 | 410 | 412 | 414 | 416 | 418 |
|---|---|---|---|---|---|---|---|---|
| SUPERVISORY COMPUTER IDENTIFIER | STEP INPUT | PROVIDER OF STEP INPUT | HASH OF STEP INPUT | DIGITAL SIGNATURE OF STEP INPUT | STEP OUTPUT | TEST PERFORMED ON STEP | TEST RESULTS OF TEST PERFORMED ON STEP | ADJUSTMENT TO STEP BASED ON TEST RESULTS |

ELECTRONICALLY VERIFYING A PROCESS FLOW

This invention was made with Government support under Contract No. FA8650-18-F-1656 awarded by the Advanced Technology Center Trusted Silicon Stratus Distributed Transition Environment (ATC-TSS-DTE). The Government has certain rights in this invention.

BACKGROUND

One or more embodiments of the present invention relates to the field of process flows. Still more specifically, one or more embodiments of the present invention relates to verifying the authenticity, integrity, and provenance of inputs to and/or outputs from steps in a process flow. Still even more specifically, one or more embodiments of the present invention relate to 1) providing secure tracking in a process flow that consists of multiple steps, and/or 2) integrating digital signatures and blockchains, thereby protecting and verifying the process flow.

A process flow describes multiple steps taken to perform a particular task. Each subsequent step in the process flow uses an output from a previous step as an input to that subsequent step. As such, a process flow can describe a process for providing a service, manufacturing a product, etc. An example of a process flow for manufacturing a product is a process flow for manufacturing an integrated circuit (IC). An IC is made up of multiple components, which are referred to as nodes, intellectual property (IP) blocks, or IP cores. As such, the process flow for generating an IC chip describes how circuits are to be laid out, what masking is used when creating the circuits and insulation therein, which layers in the IC chip contain certain circuits, connections between layers, etc. The actual construction of the IC chip, which can also be part of the process flow, then occurs by applying masked layers of various material on a wafer until multiple copies of the final IC chip are embedded on the wafer.

Electronic design automation (EDA) tools used for generating IC layouts are complex tools. EDA tools convert IP blocks at the register-transfer language (RTL) design level, using languages such as that described in the Institute of Electrical and Electronics Engineers (IEEE) standard 1800-2017; Very high speed integrated circuit Hardware Description Language (VHDL); etc. Descriptions using such languages are then converted into a final graphic database system (e.g., Graphic Database System—II, known as GDSII) format layout, which is used to describe and/or manufacture a particular IC.

In the design process, EDA tools perform many steps and run multiple processes to create executables, which generate a netlist (i.e., listing of electronic components in the IC) of the IC design, perform place-and-route of components in the IC design, and verify the design of the IC. EDA tools also load and use IP blocks from third party libraries to complete the design specification and final IC layout.

However, EDA tools do not check integrity of their inputs with respect to content and origin. IP blocks reused from libraries can lack digital signatures for authenticating their integrity and/or information on determining their provenance. At each step in the design process in the prior art, inputs are not checked for unauthorized modification, whether accidental or intentional. Additionally, in the prior art outputs from the transformation at each step in the prior art are not signed or protected against modification. As such, the authenticity, integrity, and provenance of outputs from steps in a process flow are not established.

SUMMARY

In one or more embodiments of the present invention, a method verifies an authenticity, integrity, and provenance of outputs from steps in a process flow. One or more processor(s) validate one or more inputs to each step in a process flow by verifying at least one of a hash and a digital signature of each of the one or more inputs. The processor(s) then generate digital signatures that cover outputs of each step and the one or more inputs to each step, such that the digital signatures result in a chain of digital signatures that are used to verify the process flow.

In one or more embodiments of the present invention, the processor(s) validates the chain of digital signatures of a set of binary objects, and then uses the set of binary objects in a manufacturing controller that creates a physical product.

In one or more embodiments of the present invention, the processor(s) store the chain of digital signatures in a blockchain, and then test the outputs of said each step in the process flow. This testing determines whether each step from the process flow performs a predefined function for each step. In response to the testing determining that a particular step from the process flow failed to perform the predefined function, the processor(s) implement an adjustment to the particular failed step until that particular failed step performs the predefined function. The processor(s) then store the adjustment to the particular failed step in the blockchain.

In one or more embodiments of the present invention, testing occurs during verification of digital signatures. A failed test indicates detection of some intentional or accidental modification. In one or more embodiments of the present invention, there is no initial mitigation. Rather, the fault is detected with no remediation or change to the input or the step itself. However, during later design and/or testing processes, the input to the step and/or the step itself are adjusted until the desired output is produced by that step. In one or more embodiments of the present invention, once the desired output is achieved, a digital signature that includes both the input(s) and output for that step is generated.

In one or more embodiments of the present invention, the process flow is a manufacturing flow for at least one intellectual property (IP) block in a semiconductor. The processor(s) load the manufacturing flow into a computer-controlled manufacturing controller, and then direct, via a computer-controlled manufacturing controller, a wafer fabrication device to manufacture the semiconductor using the manufacturing flow.

In one or more embodiments of the present invention, a computer program product is used to verify an authenticity, integrity, and provenance of outputs from steps in a process flow. The computer program product includes a non-transitory computer readable storage device having program instructions embodied therewith, the program instructions readable and executable by a computer to perform a method that includes, but is not limited to: validating one or more inputs to each step in a process flow by verifying at least one of a hash and a digital signature of each of the one or more inputs; and generating digital signatures that cover outputs of said each step and the one or more inputs to said each step, wherein the digital signatures result in a chain of digital signatures that are used to verify the process flow.

In one or more embodiments of the present invention, a computer system includes one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories. The stored program instructions are executed to perform a method that includes, but is not limited to: validating one or more inputs to each step in a process flow by verifying at least one of a hash and a digital signature of each of the one or more inputs; and generating digital signatures that cover outputs of said each step and the one or more inputs to said each step, wherein the digital signatures result in a chain of digital signatures that are used to verify the process flow.

BRIEF DESCRIPTION OF THE DRAWINGS

FIG. 4 depicts an exemplary blockchain ledger as used in one or more embodiments of the present invention;

DETAILED DESCRIPTION

Figure 1:
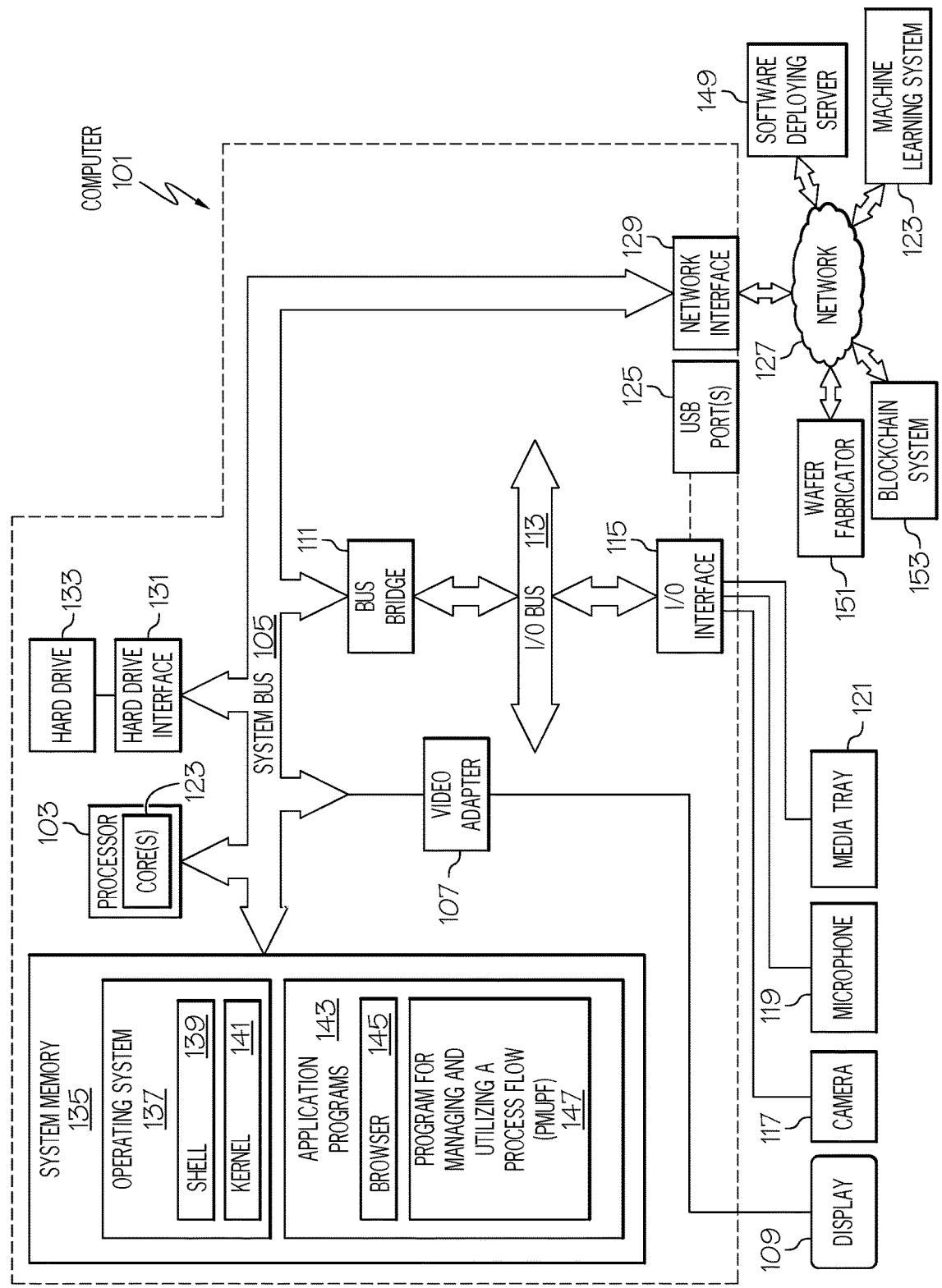
FIG. 1 depicts an exemplary system and network that is used in one or more embodiments of the present invention.

One or more embodiments of the present invention addresses security concerns in a process flow. More specifically, one or more embodiments of the present invention address security concerns regarding changes to inputs and outputs in steps in a process flow, changes to the process flow itself, etc. that are not authorized.

For example, consider a process flow for creating an Integrated Circuit (IC) design process, which needs to have integrity and provenance issues associated with the IC design process addressed. As such, one or more embodiments of the present invention detect whether Intellectual Property (IP) blocks (i.e., sub-components of the IC) have been modified, accidentally or intentionally, and whether IP blocks are from trusted parties at each step in the design flow. That is, an IC (e.g., a processor) is made up of multiple sub-components (e.g., adders, registers, arithmetic logic units, etc.). Each sub-component, whether for a particular function or that just defines a certain area on the IC chip, is known as an IP.

One or more embodiments of the present invention also track inputs used in each step of the design process, and protects and verifies the transformation from input(s) to output(s). Such tracking allows a system to determine all inputs (e.g., IP blocks, netlist) used for deriving the final output. As such, one or more embodiments of the present invention facilitate forensic investigation by providing information for determining when an implementation flaw or a malicious component was introduced into a design flow.

As described herein, one or more embodiments of the present invention utilize a blockchain to provide integrity and provenance to a design process for IP blocks, and traceability and provenance for the IP blocks.

During an IP block design process, IP blocks go through a sequence of steps (e.g., transformations) to generate a final output, such as a Graphic Database System—II (GDSII) file. That is, GDSII is a database file format that is used to describe an Integrated Circuit (IC) layout. More specifically, a GDSII file is a binary file format that provides information for a wafer manufacturing device to create an IC wafer (i.e., a semiconductor wafer disk that contains multiple copies of one or more types of integrated circuits) according to circuitry layout, layers upon which each circuit is located, electrical connectors between different layers, etc. This information is used to create photomasks, which are used in the wafer manufacturing process.

In accordance with one or more embodiments of the present invention, at each step in the process of designing a GDSII file for a particular node (also referred to as an intellectual property (IP) block or IP node) on an IC, inputs for creating that particular node are validated. Inputs are signed with a digital signature that is used to ensure that an input file has been signed by a trusted party and has not been modified. The transformation at each step (e.g., synthesis, place-and-route, etc.) is verified, checking that the transformation from input(s) to output(s) is correct with nothing extra added.

In one or more embodiments of the present invention, a trusted verifier of a step signs off on the transformation by signing the transformation of that step with its private key. The digital signature for a given step protects the integrity of the output of that step and the signature(s) of the input(s) to that step. This results in a "chain of digital signatures" that can be used to verify the authenticity, integrity and/or provenance of a complete design flow. In one or more embodiments of the present invention, the newly generated IP block (e.g., as described by a GDSII file) and the chain of digital signatures are then recorded in a blockchain. This allows a designer that is considering the use of an IP block in a sensitive application to take into account the full provenance of the IP block.

The authenticity of the design flow is defined as a confirmation that the design flow is what it purports to be, according to its identity (i.e., its name) and/or a description of what the design flow does (i.e., the functionality of the process flow).

The integrity of the process flow is defined as a confirmation that steps in the process flow and/or their inputs/outputs have not been corrupted, either by accident or by malicious actions.

The provenance of the process flow is provided by a protected and trustworthy record of all changes made to the steps and/or their inputs/outputs in the process flow, thereby showing the source and/or effect of such changes that affect the overall process flow.

A combination of the authenticity, integrity, and/or provenance of the process flow thus verifies the outputs of the steps in the process flow, and/or verifies the entire process flow itself.

The present invention provides multiple advantages over the prior art during an IP block design process.

First, the chain of signatures as described herein ensures the authenticity, integrity and/or provenance of all of inputs (e.g., to steps in IP blocks as well as additions of IP blocks to libraries) and outputs from steps in a design flow. This chain of signatures provides a complete, immutable log record of all transformations performed to generate a final output, such as a GDSII file.

Second, the invention facilitates forensic investigation. Using the chain of signatures, the system determines when an operation occurred and what entity performed the operation. Hence, the system can track when a compromise (e.g., implementation flaw or malicious code) was introduced into the design process.

Third, the chain of signatures provides information on the provenance of the design. That is, a prior art GDSII file (the final output of the design flow process) contains low level layout information but lacks provenance information on its build process. Using the chain of signatures, one or more embodiments of the present invention trace from the GDSII back to the original inputs (e.g., netlist, library cores, etc.), thereby ensuring their provenance.

When integrated with blockchain, one or more embodiments of the present invention provide end-to-end tracing across organizations and track all operations in a comprehensive manner. Thus, the blockchain provides an immutable trace.

In one or more embodiments of the present invention, the blockchain includes additional information such as the scripts and data that were used to test and prove the correctness of the block.

In one or more embodiments of the present invention, a public key infrastructure is used to bind public keys to entities. Examples of entities include, but are not limited to, a developer, organization, or process running an application. As such, one or more embodiments of the present invention trust a Certification authority (CA) to certify that a public key belongs to an entity. An entity generates a public key pair (i.e., private and public keys). The private key is kept secret and is used to digitally sign (i.e., hash and encrypt) input objects, such as IP blocks. The public key is used for verifying signatures on objects. An entity requests a certificate from a trusted CA. The CA certifies that the entity is valid and returns a signed certificate associating the entity's information with its public key. To check if an entity is a trusted party, one or more embodiments of the present invention determine that the entity's public key certificate is signed by the trusted CA.

In one or more embodiments of the present invention, entities provide self-signed certificates of their public keys.

Thus, and as described in detail herein, one or more embodiments of the present invention performs multiple operations at each step in a process flow.

First, inputs are validated at each step in a design process (e.g., using a process flow). Inputs with digital signatures are verified to ensure that they are signed by trusted parties and have not been modified. When developers create new IP blocks, they sign their IP blocks after testing and verifying their IP blocks. When input(s) (e.g., IP blocks retrieved from an IP block library) to an IC circuit design lack digital signatures, they are digitally signed (e.g., by an entity that is responsible for providing and/or implementing the design process) before their use in the design flow, in order to protect them from accidental or intentional modification.

Second, the transformation at each step (e.g., synthesis, place-and-route) in the design process flow is verified. A verifier evaluates whether or not the output corresponds to the input provided to the transformation in the step. In one or more embodiments of the present invention, the verifier is implemented as a component of the design process or as an external verifier, such as a cloud service. In one or more embodiments of the present invention, the verifier runs independently of the component performing the transformation in the step, replays the transformation, and checks whether the generated output matches the output to be validated.

Third, the verifier signs off on the transformation by generating a digital signature that protects the integrity of the output of the step and includes the signature(s) of the input(s) to the step. This results in a chain of digital signatures of the various steps that are used, in one or more embodiments of the present invention, to authenticate the integrity and provenance of the output of each step. The chain of signatures links the initial input IP blocks and subsequent steps (transformations) to the final design flow output (e.g., a final GDSII file).

In one or more embodiments of the present invention, a blockchain is employed for storing and accessing IP flow trace (e.g., VHSIC Hardware Descriptor Language—VHDL files, GDSII, scripts, test data, etc.). In one or more embodiments of the present invention, descriptions of the IP blocks in the IC design flow, as well as the chain of digital signatures for the IP blocks, are added to a blockchain.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture is shown, including both depicted hardware and software, shown for and within computer 101 utilized by software deploying server 149 and/or processing nodes within a machine learning system 123 and/or devices within a blockchain system 153 shown in FIG. 1, and/or one or more of the peers 218*a*-218*g* shown in FIG. 2, and/or supervisory computer 301 shown in FIG. 3, and/or one or more of the nodes depicted in the Deep Neural Network (DNN) 623 shown in FIG. 6.

In one or more embodiments of the present invention, exemplary computer 101 includes a processor 103 that is coupled to a system bus 105. Processor 103 utilizes one or more processors, each of which has one or more processor cores 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a microphone 119, a media tray 121 (which in one embodiment includes storage devices such as CD-ROM drives, multi-media interfaces, etc.), and external USB port(s) 125. The format of the ports connected to I/O interface 115 is that which is known to those skilled in the art of computer architecture, including but not limited to universal serial bus (USB) ports.

As depicted, computer 101 is able to communicate with a software deploying server 149 and/or other devices/systems, such as a wafer fabricator 151, a machine learning system 123, etc. using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc. As such, computer 101 and/or wafer fabricator 151 and/or blockchain system 153 are devices capable of transmitting and/or receiving wireless and/or wired communications.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Managing and Utilizing a Process How (PMUPF) 147. PMUPF 147 includes code for implementing the processes described below, including those described in FIGS. 2-7. In one embodiment, computer 101 is able to download PMUPF 147 from software deploying server 149, including in an on-demand basis, wherein the code in PMUPF 147 is not downloaded until needed for execution. In one embodiment of the present invention, software deploying server 149 performs all of the functions associated with the present invention (including execution of PMUPF 147), thus freeing computer 101 from having to use its own internal computing resources to execute PMUPF 147.

In one or more embodiments of the present invention, wafer fabricator 151 is manufacturing device that creates wafers that contain multiple copies of a particular Integrated Circuit (IC). Wafer fabricator 151 performs processes known to those skilled in the art of manufacturing a wafer/IC, including the steps of preparing a blank wafer by thermal oxidation of the wafer; masking off the wafer in order to define where certain materials are to be deposited on the wafer; etching the wafer to define channels for such materials; doping the materials in order to adjust their electrical conduction/insulation properties; depositing dielectrics and metals onto the wafer; cleaning (passivation) the wafer; electrically testing the wafer; cutting IP chips out of the wafer; and assembling the IP chips into packages of plastic/ceramic that include input/output pins that connect to the IP chips within the packages.

Figure 6:
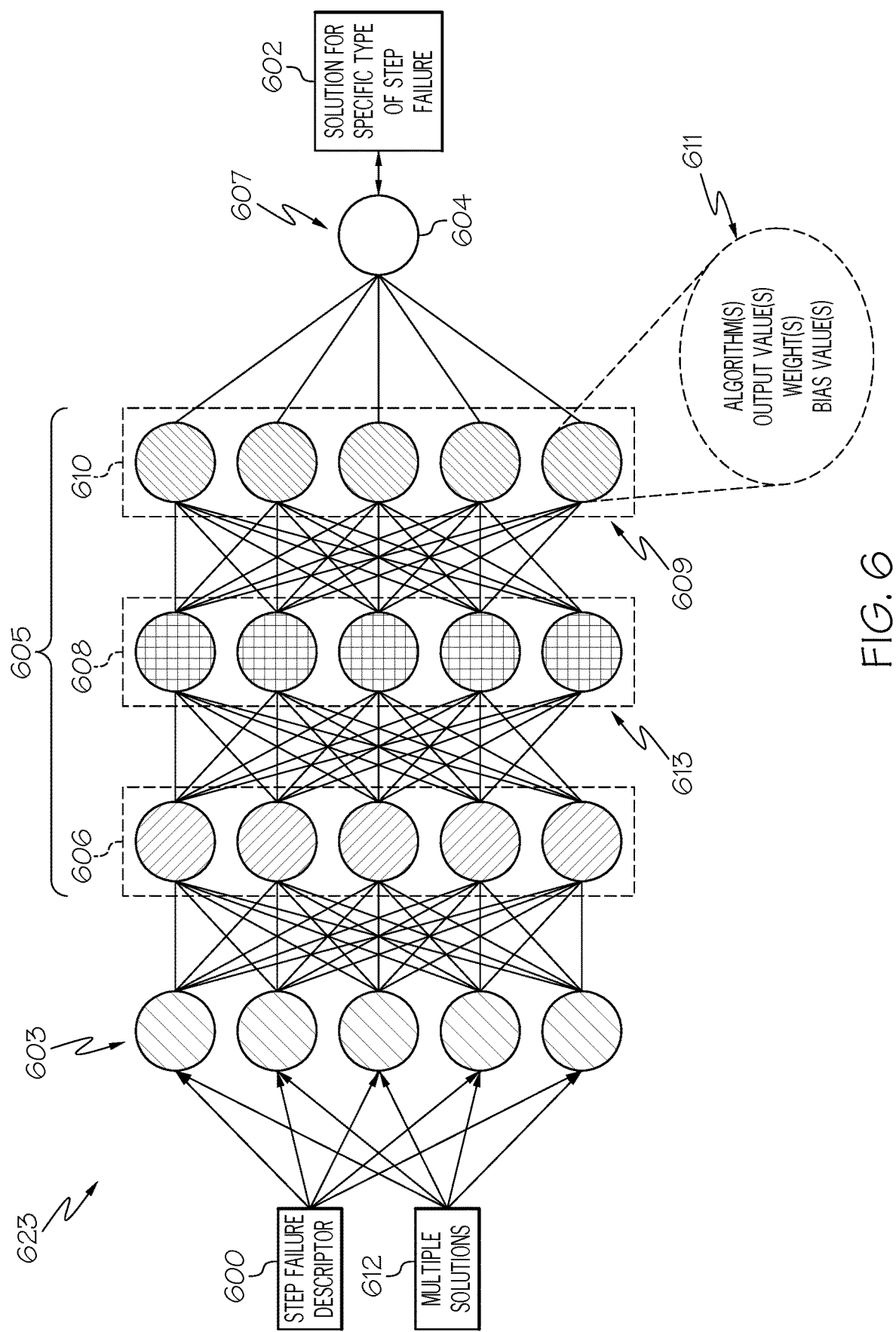
FIG. 6 illustrates an exemplary neural network as used in one or more embodiments of the present invention.

Machine learning system 123 is an artificial intelligence (AI) system, which is described in exemplary detail in the Deep Neural Network (DNN) 623 shown in FIG. 6.

Figure 2:
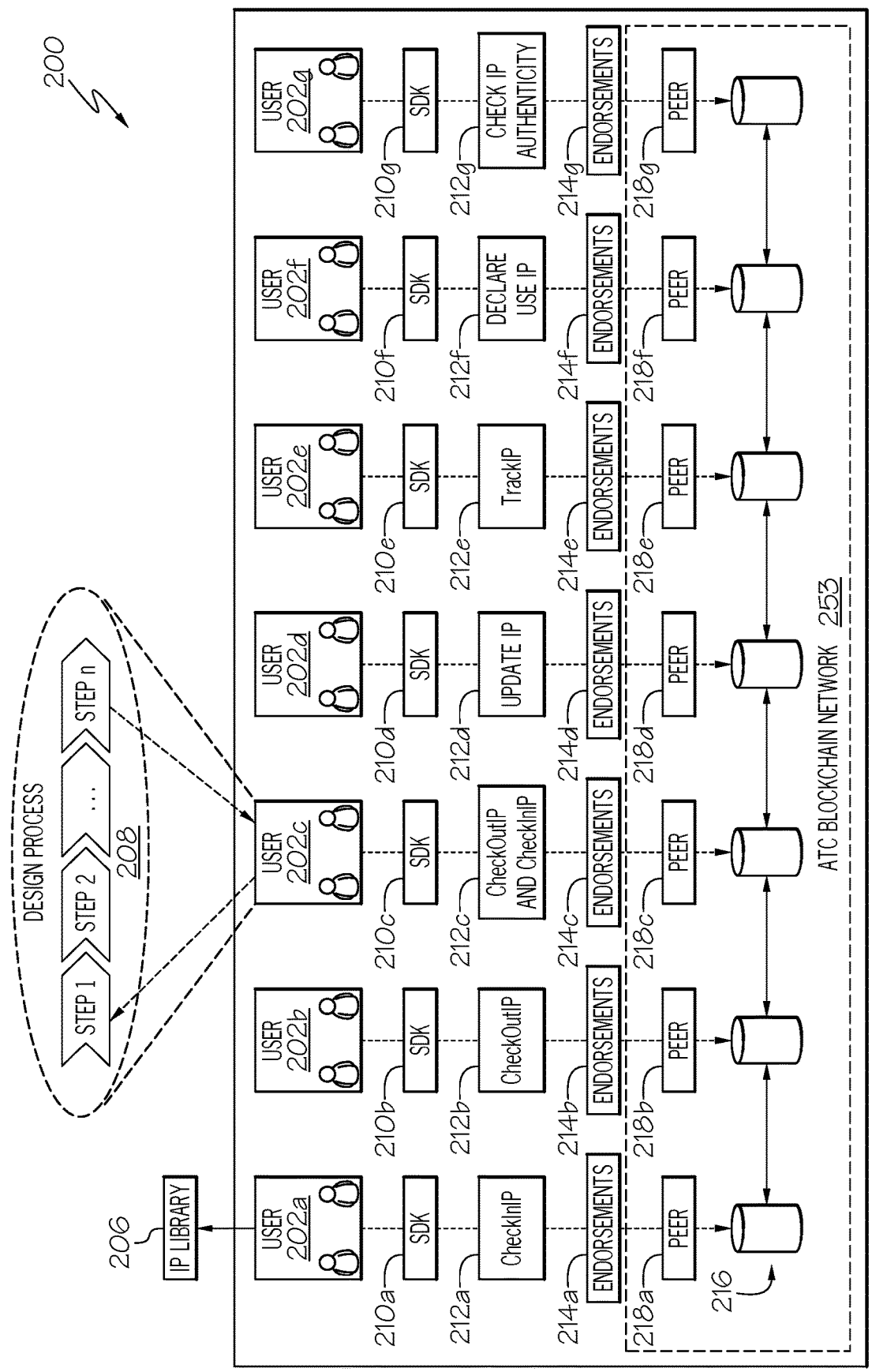
FIG. 2 depicts a high-level overview of an exemplary blockchain architecture used in one or more embodiments of the present invention.
Figure 3:
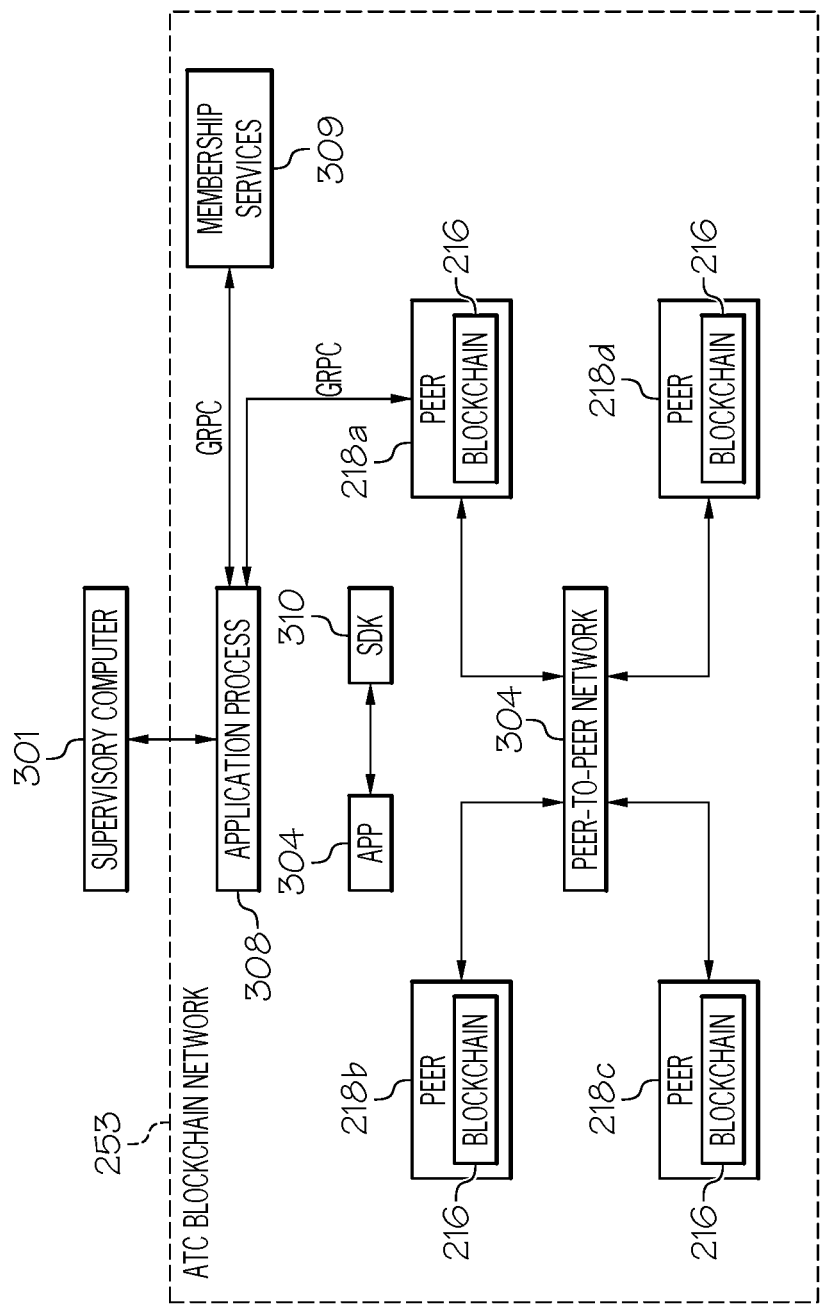
FIG. 3 illustrates additional detail of the exemplary blockchain network depicted in FIG. 2.

Blockchain system 153 is described in detail in the blockchain network 253 shown in FIG. 2 and FIG. 3.

As used herein, the terms "blockchain", "blockchain environment", "blockchain system", and "blockchain fabric" are used interchangeably to describe a system that utilizes a collection of processing devices that support a distributed system that securely controls a ledger of transactions described in a series of "blocks" (collectively also called a "blockchain").

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

With regard to FIG. 2, a high-level overview of an exemplary architecture used in one or more embodiments of the present invention is presented.

As shown in FIG. 2, architecture 200 enables users 202a-202g to utilize a blockchain network 253 in order to verify the authenticity, integrity, and/or provenance of inputs to and/or outputs from one or more steps in a process flow. Assume now, for explanatory purposes of one or more embodiments of the present invention, that the process flow is for designing and/or manufacturing an IP block in an IC. As described herein, an IP block is a physical subsection of an IC. A particular IP block can be for providing a specific functionality (e.g., a buffer for buffering data) in the IC, or can simply describe a certain area on the IC (e.g., the top half of the IC).

An exemplary process for designing and/or manufacturing the IC includes 1) writing code that describes the IC; 2) compiling that code; 3) inputting the compiled code into a computer-aided design (CAD) program for ICs; 4) synthesizing the output of the CAD program in a high-level program using a Very high speed integrated circuit Hardware Description Language (VHDL); 5) generating a low-level netlist of components of the IC; 6) placing and routing these components in the IC to establish a final layout of the IC; 7) producing masks that are used to produce dies, metal layers, etc. to make wafers/chips; and 8) packaging the chips (e.g., in ceramic/plastic that includes input/output pins) as the finished IC product.

As shown in Action 21, a user (e.g., user 202a from users 202a-202g) first creates IP1, which describes an IP block in an IC, and stores it in an IP library 206. As shown in FIG. 2 and described below, IP1 is created by some party (e.g., one of the users shown in FIG. 2 or a third-party user, not shown in FIG. 2) during a design process. Later, user 202b checks out the same IP1, in order to utilize it in a new design, or to just look at it in order to see what it is/does.

A Software Development Kit (SDK) 210a executes an IP record operation 212a, describing the creation of and/or checking in IP1 to the IP library 206, thus creating a blockchain endorsement 214a, which is a consensus reached by peers in a blockchain system that the transaction (e.g., creating an IP by design process 208 and/or checking in an IP into IP library 206), as described in detail below in FIG. 7.

As shown in Action 22, user 202c later checks out IP1 from the IP library 206 and sends it to design process 208, which is behind a firewall or air gapped (not accessible remotely). At the same time, SDK 210c executes an IP record operation 212c, describing the fact that user 202c has checked IP1 out of the IP library 206 and sent it to design process 208. IP record operation 212c creates a blockchain transaction together with the endorsement 214c (in which peers in the blockchain system verify that design process 208 received the checked out IP1), which is a transaction that is to be appended to blockchain 216 for manipulation in the blockchain 216 by peers 218a-218g in the blockchain network 253.

As shown in Action 23, design process 208 then creates a new IP2 along with signatures for what entity created IP2, where it was created, when it was created, etc. That is, the design process 208, modifies IP1 by executing Step 1, Step 2 . . . Step n (in a confidential manner), where each step from Steps 1-n creates its own signature. Ultimately, process 208 produces a new IP2 with attached chains of signatures.

As shown in Action 24, user 202c then retrieves the new IP2 from the design process 208, and checks it into the IP library 206. However, IP library 206 can be unsecure. As such, IP1 and IP2 could be checked out of IP library 206 by an unauthorized user, and modified in a manner that is likely to cause problems to other users who are not aware of the modifications. Therefore, the blockchain endorsement 214a and blockchain endorsement 214c provide verifications of updates to IP1 to the blockchain 216, whose security is maintained by the peers 218a-218g in the blockchain network 253.

Therefore, and as shown in Action 25, IP2 is validated by the SDK 210c creating IP record operation 212c, describing the fact that user 202c has 1) created IP2 from IP1; 2) added signatures for who created IP2, when IP2 was created, etc.; 3) stored IP2 in the IP library 206; and 4) sent the transaction that is verified by the peers 218a-218g in the blockchain network 254. Thus, the peers 218a-218g collectively confirm the validity of transactions related to IP2.

As shown in Action 26, IP2 is now accepted into the blockchain 216 by the blockchain network 253 and integrated with the overall blockchain trace provided by the peers 218a-218g.

As such, architecture 200 provides a novel use of blockchains to securely maintain changes to a process flow, such as creating an IP block in an IC.

That is, the architecture 200 ensures that inputs to each stage (step in the design process 208) are correct and that each transformation from one step to the next is correct (e.g., no extraneous steps are added).

Architecture 200 provides for independent verification for transformations by "signing off" on each change by "affixing" a digital signature to the output of each step.

In one or more embodiments of the present invention, the original design of the process design is initially signed by the "owner", and additional signatures are added at each new step in order to form a chain/blockchain. As such, this chain/blockchain of signatures from the original design to any of the "artifacts" (changes to the process) will attest to the authenticity, integrity, and/or provenance of the artifact.

While seven users (user 202a-user 202g), seven SDKs (SDK 210a-SDK 210g), seven IP record operations (IP record operation 212a-IP record operation 212g), seven endorsements (endorsement 214a-endorsement 214g); seven peers (peer 218a-peer 218g), and "n" steps (where "n" is an integer) in the design process 208, it is understood that more or fewer of each of these elements can be part of the architecture 200 depicted in FIG. 2.

More specifically, besides IP record operations for checking in an IP design into the IP library 206 (e.g., IP record operation 212a and IP record operation 212c), and for checking out an IP design from the IP library 206 (e.g., IP record operation 212b and IP record operation 212c), other IP operations that are sent to the blockchain network 253 include, but are not limited to, updating (without creating) an existing IP record (e.g., IP record operation 212d), tracking changes to an IP record (e.g., IP record operation 212e), declaring that a particular IP design is being used (e.g., IP record operation 212f), checking the authenticity of a particular IP design (e.g., IP record operation 212g), etc.

With reference now to FIG. 3, additional detail of the blockchain network 253 shown in FIG. 2 is presented.

In one or more embodiments of the present invention, the blockchain network 253, depicted in FIG. 3, is used to provide the infrastructure (e.g. execution of the chaincodes) and services (e.g., Membership services such as Identity management) for securely and transparently storing, tracking and managing transactions on a "single point of truth". The blockchain network 253 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain network 253 (also known as a "blockchain fabric", a "blockchain system", an "open blockchain", or a "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 3, peers 218a-218d (i.e., shown in FIG. 2, but which may include and/or be replaced by other peers from peers 218a-218g shown in FIG. 2) establish the validity of the transaction parameters and, once they reach consensus, a new block is generated and appended onto the blockchain network. That is, an application process 308 (e.g., design process 208 shown in FIG. 2) running on a supervisory computer 301 (analogous to computer 101 shown in FIG. 1) executes an application such as the depicted App 303, causing a software development kit (SDK) 310 (analogous to SDKs 210a-210g shown in FIG. 2) to communicate using general remote procedure calls (grpc) to membership services 309 that support the peer-to-peer network 304, which supports the blockchain 216 using the peers 218a-218d that were introduced in FIG. 2.

With reference now to FIG. 4, an exemplary blockchain ledger 400 within blockchain 216 as utilized in one or more embodiments of the present invention is depicted.

In one or more embodiments of the present invention, blockchain ledger 400 includes an identifier of the supervisory computer (shown in block 402), such as supervisory computer 301 shown in FIG. 3, that supports and/or utilizes the architecture 200 shown in FIG. 2. For example, in one or more embodiments of the present invention block 402 includes an internet protocol (IP) address, a uniform resource locator (URL), etc. of the supervisory computer. This information is used by peers in the peer-to-peer network 304 shown in FIG. 3 to receive transactions related to the process flow described herein.

In one or more embodiments of the present invention, blockchain ledger 400 also includes an identifier of a step input to a step in the process flow, as shown in block 404. For example, if the process flow was for a process for designing/manufacturing an IP block, then the step input could be a change to a circuit in the IP block, a change to manufacturing conditions (e.g., temperature, pressure, amount of material to be splattered on the wafer, etc.), etc.

In one or more embodiments of the present invention, blockchain ledger 400 also includes the identities of entities (e.g., persons, enterprises, systems, etc.) that are making the change to the step by providing the step input, as shown in block 406.

In one or more embodiments of the present invention, blockchain ledger 400 also includes a hash of the step input, as shown in block 408. For example, assume that the step input is a binary that, when executed, causes a wafer fab machine to perform a certain operation, such as applying a masked material on the wafer being manufactured. In order to provide additional security, the provider of the step input can create a hash, which can be used to validate the step input. Thus, if additional security is desired, then block 408 can be added to the blockchain so that users can verify the validity of the step input 404.

In one or more embodiments of the present invention, blockchain ledger 400 also includes a digital signature of the step input, as shown in block 410. Thus, if additional security is desired, block 410 can be added to the blockchain ledger. This allows peers in the blockchain network that have access to the signer's public key to verify the digital signature.

In one or more embodiments of the present invention, blockchain ledger 400 also includes the step output of the step being altered by the step input, as shown in block 412. For example, if a particular step in the process flow takes in a new input (e.g., the step input shown in block 404), then the output of that step using the new input as shown in block 412.

In one or more embodiments of the present invention, blockchain ledger 400 also includes a description of a test that is performed on the step input after receiving the step input, as shown in block 414. That is, assume that the process flow is to manufacture an IC. After the process flow is changed by a change to the step input shown in block 404, and the IC is manufactured (either physically built or else simulated), the block 414 will describe the test performed (e.g., "Test A—high temperature test") on the changed IC. If the test is only on whether the step alone will pass, then the description of the test could be "Test B—isolation test".

In one or more embodiments of the present invention, blockchain ledger 400 also includes the test results on the test performed on the step (block 414), such as "Pass" or "Fail".

In one or more embodiments of the present invention, blockchain ledger 400 also includes a description of what adjustments were made based on the test results from block 416, as described in block 418. For example, assume that the step was to control feedstock to a manufacturing device, and the step input changed from 4 to 6. However, this caused the amount of feedstock being sent to the manufacturing device to be excessive, thus causing the manufacturing device to break. Assume therefore that the step input was then dropped down from 6 to 5, and the manufacturing device was then able to function properly (at a higher rate). This adjustment from 6 to 5 is reflected in block 418.

Thus, by identifying the new step input (block 404, block 408, and/or block 410), the entity providing the step input (block 406), the new output of the step (block 412), and any tests/adjustments made to the step input (block 414, block 416, and/or block 418), the authenticity, integrity, and/or provenance of the outputs of each of the steps in the process flow is established based on the chain of digital signatures, such as the blockchain ledger 400.

Figure 5:
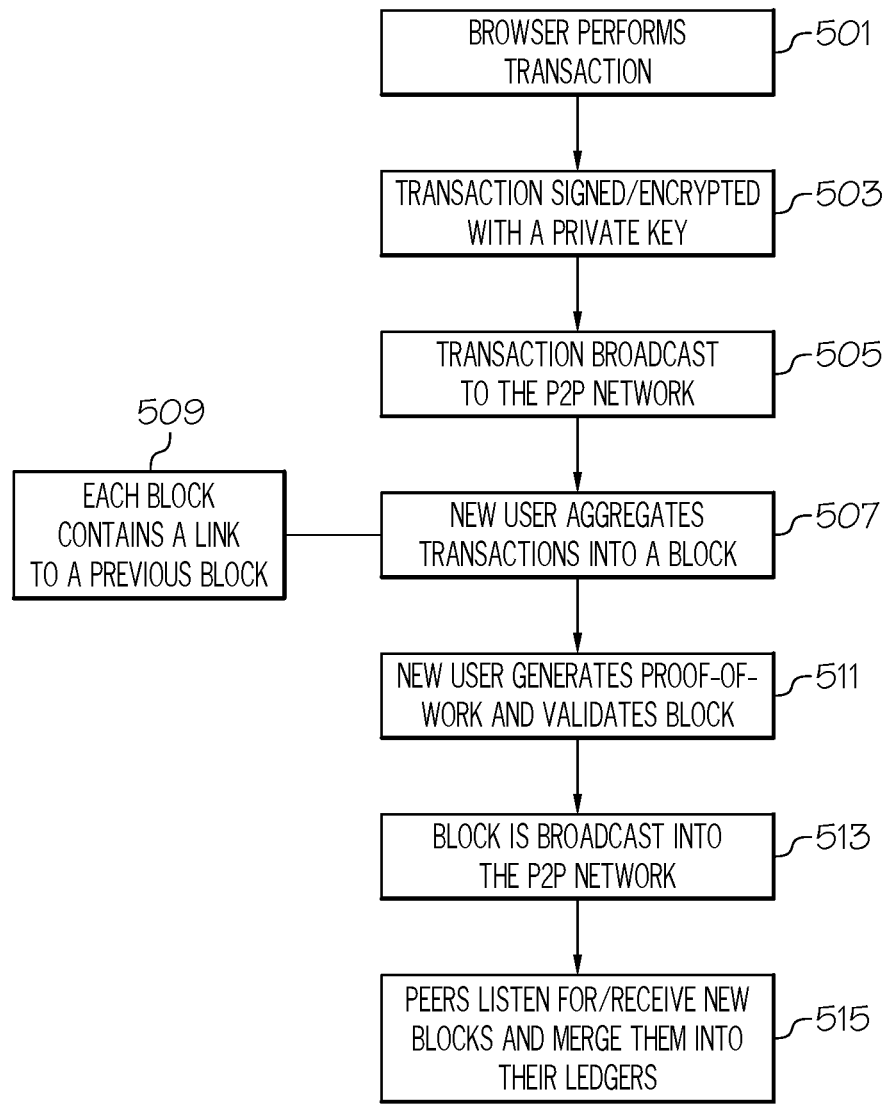
FIG. 5 illustrates a high-level set of operations using a blockchain in accordance with one or more embodiments of the present invention.

Exemplary operation of the blockchain network 253 shown in FIG. 3 is presented in FIG. 5. As described in step 501, a browser or other device (e.g., supervisory computer 301 shown in FIG. 3) performs a transaction (e.g., to identify a change to an input to a step in a process flow). As shown in step 503, the supervisory computer 301 hashes the transaction with a hash algorithm, such as Secure Hash Algorithm (SHA-2) and then signs the hash with a digital signature. This signature is then broadcast to the peer-to-peer network 304 shown in FIG. 3, as described in step 505. A peer in the peer-to-peer network 304 (e.g., peer 218a) aggregates the transaction(s) into blockchain 216 shown in FIG. 3, as shown in step 507. As shown in block 509, each block contains a link to a previous block. The newly-revised blockchain 216 is validated by one or more of the other peers in peers 218a-218d and/or by other peers from other authorized blockchain systems (step 511). The validated block is then broadcast to the peers 218b-218d, as described in step 513. These peers 218b-218d listen for and receive the new blocks and merge them into their copies of blockchain 216 (step 515).

Thus, the blockchain fabric described in FIG. 2 through FIG. 5 describe a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide protected data for subsequent blocks in the blockchain.

That is, the blockchain fabric described herein provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., hashed) based on one or more previous blocks.

As described above, changes to a step in a process flow can result in a failure of that step and/or the entire process flow. As such, in one or more embodiments of the present invention, a user can be presented with a graphical user interface (GUI) that 1) identifies the process, 2) identifies the failed step, 3) explains why the step failed, 4) provides possible solutions for fixing the failed step, 5) receives a selection of a presented solution from the user, 6) implements the received selection of the presented solution, and 7) returns a message to the user regarding whether or not the newly-amended step is now working.

For example, assume that the supervisory computer is monitoring a process flow for manufacturing a particular IP block (1—identifies the process), and that the supervisory computer determines that a change (a change in circuitry) to that IP block caused it to no longer function properly (2—identifies the failed step), since the IP block cannot handle the heat load it creates (3—explains why the step failed). As such, the supervisory computer looks up a set of possible solutions, such as replacing the changed circuit with a smaller circuit, and presents these solutions to the user on a GUI (4—provides possible solutions for fixing the failed step). The user selects one of the proposed solutions and sends that selection to the supervisory computer (5—receives a selection of a presented solution from the user), which then modifies that IP block accordingly (6—implements the received selection of the presented solution). The supervisory computer directs the newly modified IP block to be tested, either physically or in simulation, and lets the user know whether or not the user-selected solution worked (7—returns a message to the user regarding whether or not the newly-amended step is now working).

In an embodiment of the present invention, rather than rely on a user to choose a solution to the problem, a neural network is trained to make this choice.

With reference then to FIG. 6, an exemplary deep neural network (DNN) 623 (analogous to machine learning system 123 shown in FIG. 1) as utilized in one or more embodiments of the present invention is presented. The nodes within DNN 623 represent hardware processors, virtual processors, software algorithms, or a combination of hardware processors, virtual processors, and/or software algorithms.

In one or more embodiments of the present invention, DNN 623 is trained to recognize a particular type of step failure and an appropriate solution thereto using training data. Thereafter, when a system/user identifies a particular type of step failure in a process flow, DNN 623 analyzes a descriptor of that step failure in order to selectively direct that the appropriate solution to that failure is executed.

Thus, DNN 623 is used to process a step failure descriptor 600 and the multiple solutions 612 as described herein.

When step failure descriptor 600 (e.g., a description of a step failure in a process flow) and multiple solutions 612 are input into a trained version of DNN 623, an identification of which solution to use to address that step failure is identified in an output 602 from the DNN 623. In order to provide this functionality, DNN 623 must first be trained.

Thus, and in one or more embodiments of the present invention, DNN 623 is trained using by inputting a training step failure descriptor (a form of step failure descriptor 600) and a set of training multiple solutions (a form of multiple solutions 612) into DNN 623. The training step failure descriptor is selected according to features of the training multiple solutions.

That is, the training step failure descriptor contains information regarding what type of failure has occurred. This information includes, but is not limited to, not only a description of the failure itself (e.g., a known input to a step does not produce an output that is expected to be output from that step, based on what the step was designed to do), but also risk/impact metadata about how available the step is to the public (i.e., is it accessible to anyone, or only to anyone with an encryption key, or only anyone with access to a blockchain system, or only to a system that is part of the blockchain system, etc.; does a failure of the step cause the entire process to fail or not; etc.). Thus, a highly accessible step ("accessible to anyone") is much more likely to be compromised than a tightly restricted step ("access only to a system that is part of the blockchain system"), and thus a solution to a problem with the step failure will include solutions that are tailored accordingly. For example, if the type of step failure only occurs in steps that are accessible only to systems in the blockchain system that controls access to the process flow, then the DNN 623 is trained to correct a problem with the blockchain system, such as access control, operations of nodes, etc. However, if the type of step failure occurs in a step that is open to any entity, then the DNN 623 is trained to correct a problem caused by the total lack of security for the process flow.

The impact of such a failure is also a factor in determining how (or even whether) to correct the failure to the step. That is, if a particular change to an input to a step does not cause a degradation in the overall process flow, then the system could determine that no solution is needed. However, if the change to the input to the step causes a failure in the process flow (e.g., the process fails to complete), then a solution is selected and implemented.

Thus, DNN 623 is trained to recognize a particular type of step failure descriptor and a particular type of multiple solutions when determining what solution to recommend and/or implement for solving the problem with the step.

While the high-level overview of training DNN 623 shown above describes just one training step failure descriptor and one type of training multiple solutions, in a preferred embodiment of the present invention multiple training step failure descriptors and their associated training multiple solutions are input into DNN 623 during training, such that DNN 623 is able to recognize many types of step failure descriptors and multiple solutions that are input to the trained DNN 623.

DNN 623 is an exemplary type of neural network used in one or more embodiments of the present. Other neural networks that can be used in one or more embodiments of the present invention include convolutional neural networks (CNNs) and neural networks that use other forms of deep learning.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

The electronic neurons (also referred to herein simply as "neurons" or "nodes") in DNN 623 are arranged in layers, known as an input layer 603, hidden layers 605, and an output layer 607. The input layer 603 includes neurons/nodes that take input data, and send it to a series of hidden layers of neurons (e.g., hidden layers 605), in which neurons from one layer in the hidden layers are interconnected with all neurons in a next layer in the hidden layers 605. The final layer in the hidden layers 605 then outputs a computational result to the output layer 607, which is often a single node for holding vector information.

As just mentioned, each node in the depicted DNN 623 represents an electronic neuron, such as the depicted neuron 609. As shown in block 611, each neuron (including neuron 609) functionally includes at least three features: an algorithm, an output value, a weight, and a bias value.

The algorithm is a mathematic formula for processing data from one or more upstream neurons. For example, assume that one or more of the neurons depicted in the middle hidden layers 605 send data values to neuron 609. Neuron 609 then processes these data values by executing the mathematical function shown in block 611, in order to create one or more output values, which are then sent to another neuron, such as another neuron within the hidden layers 605 or a neuron in the output layer 607. Each neuron also has a weight that is specific for that neuron and/or for other connected neurons. Furthermore, the output value(s) are added to bias value(s), which increase or decrease the output value, allowing the DNN 623 to be further "fine-tuned".

For example, assume that neuron 613 is sending the results of its analysis of a piece of data to neuron 609. Neuron 609 has a first weight that defines how important data coming specifically from neuron 613 is. If the data is important, then data coming from neuron 613 is weighted heavily, and/or increased by the bias value, thus causing the mathematical function (s) within neuron 609 to generate a higher output, which will have a heavier impact on neurons in the output layer 607. Similarly, if neuron 613 has been determined to be significant to the operations of neuron 609, then the weight in neuron 613 will be increased, such that neuron 609 receives a higher value for the output of the mathematical function in the neuron 613. Alternatively, the output of neuron 609 can be minimized by decreasing the weight and/or bias used to affect the output of neuron 609. These weights/biases are adjustable for one, some, or all of the neurons in the DNN 623, such that a reliable output will result from output layer 607. In one or more embodiments of the present invention, finding the values of weights and bias values is done automatically by training the neural network. In one or more embodiments of the present invention, manual adjustments are applied to tune hyperparameters such as learning rate, dropout, regularization factor and so on. As such, training a neural network involves running forward propagation and backward propagation on multiple data sets until the optimal weights and bias values are achieved to minimize a loss function. The loss function measures the difference in the predicted values by the neural network and the actual labels for the different inputs.

When manually adjusted during the training of DNN 623, the weights are adjusted by the user, sensor logic, etc. in a repeated manner until the output from output layer 607 matches expectations. For example, assume that input layer 603 receives training inputs that describe a particular type of step failure and solutions for that type of step failure. Once DNN 623 has been properly trained (by adjusting the mathematical function (s), output value(s), weight(s), and biases in one or more of the electronic neurons within DNN 623), the trained DNN 623 will output a vector/value to the output layer 607, indicating that the neuron 604 describes a particular solution for a particular type of step failure, which is presented in output 602.

When automatically adjusted, the weights (and/or mathematical functions) are adjusted using "back propagation", in which weight values of the neurons are adjusted by using a "gradient descent" method that determines which direction each weight value should be adjusted to. This gradient descent process moves the weight in each neuron in a certain direction until the output from output layer 607 improves (e.g., accurately describes the requested resource that should be returned to the requester).

As shown in FIG. 6, various layers of neurons are shaded differently, indicating that, in one or more embodiments of the present invention, they are specifically trained for recognizing different aspects of a candidate resource and/or a policy that controls them.

Thus, in one or more embodiments of the present invention, within the hidden layers 605 are layer 606, which contains neurons that are designed to evaluate a first set of step failure features (e.g., descriptions of what entity made the changes to the step that caused it to fail); layer 608, which contains neurons that are designed to evaluate a second set of features (e.g., when the change to the step occurred); and layer 610, which contains neurons that are designed to recognize certain types of step failures.

The outputs of neurons from layer 610 then control the value found in output layer 607.

While FIG. 6 depicts an embodiment of the present invention in which a DNN is used to establish an embedding for an unlabeled vertex in a hypergraph. Alternatively, unsupervised reinforced learning, such as Q-learning, can be utilized in one or more embodiments of the present invention.

Unsupervised reinforced learning is an artificial intelligence that uses train and error to eventually find an optimal approach to a task. For example, if the task is to hit a ball with a bat, a robot will randomly swing a bat at the pitched ball. If the bat swings above or below the pitched ball, or if the bat swings before or after the pitched ball passes by the bat, then a negative value (i.e., a negative reward) is given to the actions of the bat, thus encouraging the robot not to take such a swing. However, if the bat "tips" the pitched ball, then a positive reward/value is given to the robot for this swing, thus encouraging the robot to take such a swing. If the bat connects solidly with the pitched ball, then an even higher reward/value is given to the robot for taking this swing, thus encouraging the robot even further to take such a swing.

A Q-learning reinforced learning system uses a Q-learning algorithm, which updates Q values of rewards when the actor/robot performs a certain action (swinging a bat) in a certain state (when the pitched ball is approaching the robot).

Using these same approaches with the present invention, an unsupervised reinforced learning and/or a Q-learning reinforced learning system learns which solution is best suited for solving a particular failure in a particular step in a particular process flow.

Figure 7:
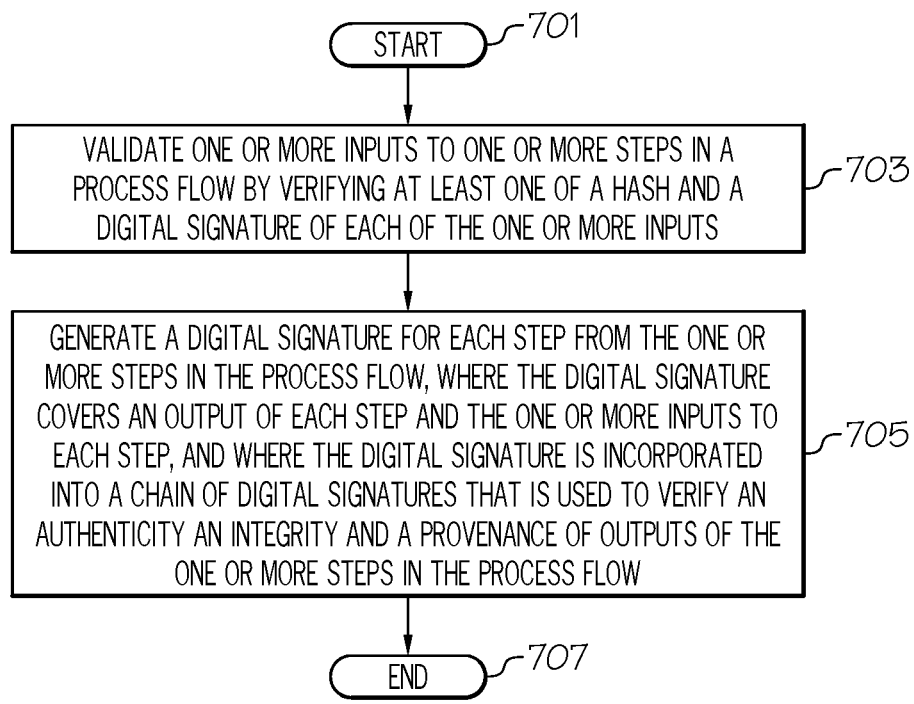
FIG. 7 is a high-level flow-chart of one or more steps performed in a processor-based method in accordance with one or more embodiments of the present invention.

With reference now to FIG. 7, a high-level flow chart of one or more operations performed in one or more embodiments of the present invention is presented.

After initiator block 701, one or more processors (e.g., within computer 101 shown in FIG. 1 and/or supervisory computer 301 shown in FIG. 3) validate inputs to steps in a process flow by verifying each of the inputs, as shown in block 703. That is, the processor(s) validate one or more inputs to each step in the process flow by verifying at least one of a hash and a digital signature of each of the one or more inputs. As such, a hash of the input(s) is created by inputting the input(s) into an algorithm that creates another (e.g., smaller) set of data for those input(s). In one or more embodiments of the present invention, the process flow describes a creation of a product, such as an IP block, another physical device, a service, etc.

As described in block 705, the processor(s) generate digital signatures that cover outputs of each step and the one or more inputs to each step, where the digital signatures result in a chain of digital signatures that are used to verify outputs of the one or more steps in the process flow. That is, the processor(s) generate a chain of digital signatures from the digital signature for each of the steps in the process flow, such that the chain of digital signatures creates an immutable record of the output and one or more inputs for each step in the process flow. This verification provides a verification of an authenticity of the inputs to each step in the process flow, the outputs from each step in the process flow, the steps themselves, and/or the entire process flow (i.e., ensures that the steps and/or the process flow are in fact what they purport to be, as described by their name, description, etc.); an integrity of the steps and/or outputs and/or the entire process flow (i.e., ensures that the steps and/or inputs/outputs for the steps and or the entire process flow has not been corrupted by unauthorized actions); and/or a provenance of inputs to the steps, outputs from the steps, the steps themselves, and/or the entire process flow (i.e., as provided by a protected and trustworthy record of all changes made to the steps and/or their inputs/outputs in the process flow).

In one or more embodiments of the present invention, a digital signature for a step is an encryption of the hash of the output and the inputs of a step. In one of more embodiments of the present invention, this digital signature is part of a blockchain ledger, such as the blockchain ledger 400 shown in FIG. 4. As such, the processor(s) generate a chain of digital signatures (e.g., blockchain 216 introduced in FIG. 2) for each of the steps (one or more of the steps) in the process flow.

In one or more embodiments of the present invention, the final process flow is then executed, in order to perform a certain process, create a physical product, etc.

The flow chart ends at terminator block 707.

The processes described in the flow chart in FIG. 7 can be performed serially or as a batch. That is, in one or more embodiments of the present invention, each time there is an occurrence of a change to an input to a step, a change to an output of that step, a change to that step itself, and/or a failure by that step, a digital signature is created and/or an entry into a blockchain is made at the time of such events/change(s), thus making the process shown in FIG. 7 a set of serial operations. In one or more other embodiments, however, a record of changes to the inputs of multiple steps in the process flow, changes to the outputs of multiple steps in the process flow, changes to multiple steps, and/or multiple step failures are stored, and then processed together at a later time as a batch transaction, in order to change the chain of digital signatures and/or the blockchain in a batch operation.

A digital signature is a sequence of binary digits (or bits) based on a mathematical scheme that can be used to verify the authenticity and integrity of a binary encoded message or document. In a digital signature-based system, a signer signs a message or document with his or her private key. And a verifier uses the signer's public key to verify the authenticity and integrity of the signed message or document or the inputs and outputs of a process flow.

As such, in one or more embodiments of the present invention, a chain of digital signatures protects a set of executables. That is, by validating the chain of digital signatures for the inputs and/or outputs from steps in the process flow before the process flow is performed (e.g., executables described in the steps are loaded onto a manufacturing controller, then the manufacturing controller is assured that both the steps in the process flow and the executables associated therewith are valid. Thus, after verifying the process flow and executables (binaries), the binaries are then loaded onto the manufacturing controller, in order to design and/or manufacture that physical product.

For example, if the process flow is a manufacturing flow for at least one intellectual property (IP) block in a semiconductor, the processor(s) load the revealed binaries for that manufacturing flow into a computer-controlled manufacturing controller (e.g., a wafer fabrication device), which causes the computer-controlled manufacturing controller to direct the wafer fabrication device to manufacture the semiconductor using the manufacturing flow.

In one or more embodiments of the present invention, the process flow designs an intellectual property (IP) block in the semiconductor. That is, the process flow is a set of instructions for how to design or manufacture a particular section/node (called an IP block) within the semiconductor. If the semiconductor is a processor, then IP blocks in the semiconductor could be adders, comparers, registers, etc.

Thus, the hash and the digital signature of each of the one or more inputs validate a source of each of the one or more inputs (e.g., who created the inputs), a description of each of the one or more inputs (e.g., values, instructions, etc. found in the inputs), and/or a tool used to create each of the one or more inputs (e.g., a synthesis tool, an optical proximity correction tool, a place and route tool, etc.). That is, the tool used to create each of the one or more inputs is from a group consisting of a synthesis tool, a place and route tool, and an optical proximity correction tool used in a design of the IP block in the semiconductor.

Thus, when used to design/manufacture an integrated circuit or another physical product, the process flow generates a physical product. As such, the hash and the digital signature of each of the one or more inputs describes a source of each of the one or more inputs, a description of each of the one or more inputs, and a unique identification of a tool used to create each of the one or more inputs.

In one or more embodiments of the present invention, the chain of digital signatures is added to a blockchain in order to provide an immutable record of the one or more inputs and the outputs of said each step, as described herein.

In one or more embodiments of the present invention, a previously produced output is used as an input to a step in the process flow, and a chain of digital signatures from a blockchain is used to verify an authenticity, an integrity and/or a provenance of the previously produced output, as described herein.

In one or more embodiments of the present invention, the processor(s) store the chain of digital signatures in a blockchain; test the outputs of each step in the process flow, where the test determines whether each step from the process flow performs a predefined function of said each step; in response to the test determining that a particular step from the process flow failed to perform the predefined function, implement an adjustment to the particular failed step from the process flow until the particular failed step from the process flow performs the predefined function; and storing the adjustment to the particular failed step in the blockchain. That is, if the test fails, then (rather than adjusting the inputs to the step), the step itself is changed. For example, if the step is a process that is designated to output a particular level of feedstock used in a manufacturing process, but this output value changes to something other than the desired particular level of feedstock, then rather than changing the input to the step, the step itself is changed, by adding addition feedstock sources, etc.

In one or more embodiments of the present invention, the processor(s) present the step from the process flow that failed to perform the predefined function on a graphical user interface, where the graphical user interface includes options for a user to adjust the step from the process flow; receive a user selection of one or more of the options; and implement the user selection of the one or more of the options until the step from the process flow performs the predefined function. As such, the user can determine how to address the failed step.

In one or more embodiments of the present invention, the processor(s) train a neural network to identify a solution that causes the failed step from the process flow. The processor (s) then input a description of the failed step into the trained neural network, and implement the solution identified by the neural network such that the failed step from the process flow now performs the predefined function. (See FIG. 6.)

In one or more embodiments of the present invention, validating the inputs to the steps includes verifying at least one of the hash and the digital signature of each of the inputs to the steps in the process flow. That is, the hash (shown in block 408 in FIG. 4) and the digital signature (shown in block 410 in FIG. 4) of the step inputs are verified as being accurate by comparing the hash/digital signature to a known hash/digital signature for the inputs.

In one or more embodiments of the present invention, one or more of the inputs to the steps in the process flow is a changed input that is derived from an original input to one or more of the steps in the process flow. That is, assume that the input to the step has been changed. As such, one or more embodiments of the present invention verify the authenticity, integrity, and/or provenance of the outputs from the step that resulted from these changed inputs.

Furthermore, and in one or more embodiments of the present invention, the authenticity, integrity, and/or provenance of the changed inputs to the step are established based on the digital record (e.g., the blockchain).

Thus, and in one or more embodiments of the present invention, the processor(s) authenticate the provenance of the inputs based on the digital signature of each of the inputs to the steps in the process flow.

In one or more embodiments of the present invention, one or more processors generate multiple blockchain transactions, where each blockchain transaction from the multiple blockchain transactions is for a particular step in the process flow, where each blockchain transaction describes a change to at least one of the one or more inputs to each particular step in the process flow, and where each blockchain transaction further describes a change to the output of each particular step in the process flow. The processor(s) store the multiple blockchain transactions in a non-linear blockchain that includes multiple different pathways to an originating blockchain ledger for the particular step in the non-linear blockchain.

Figure 8:
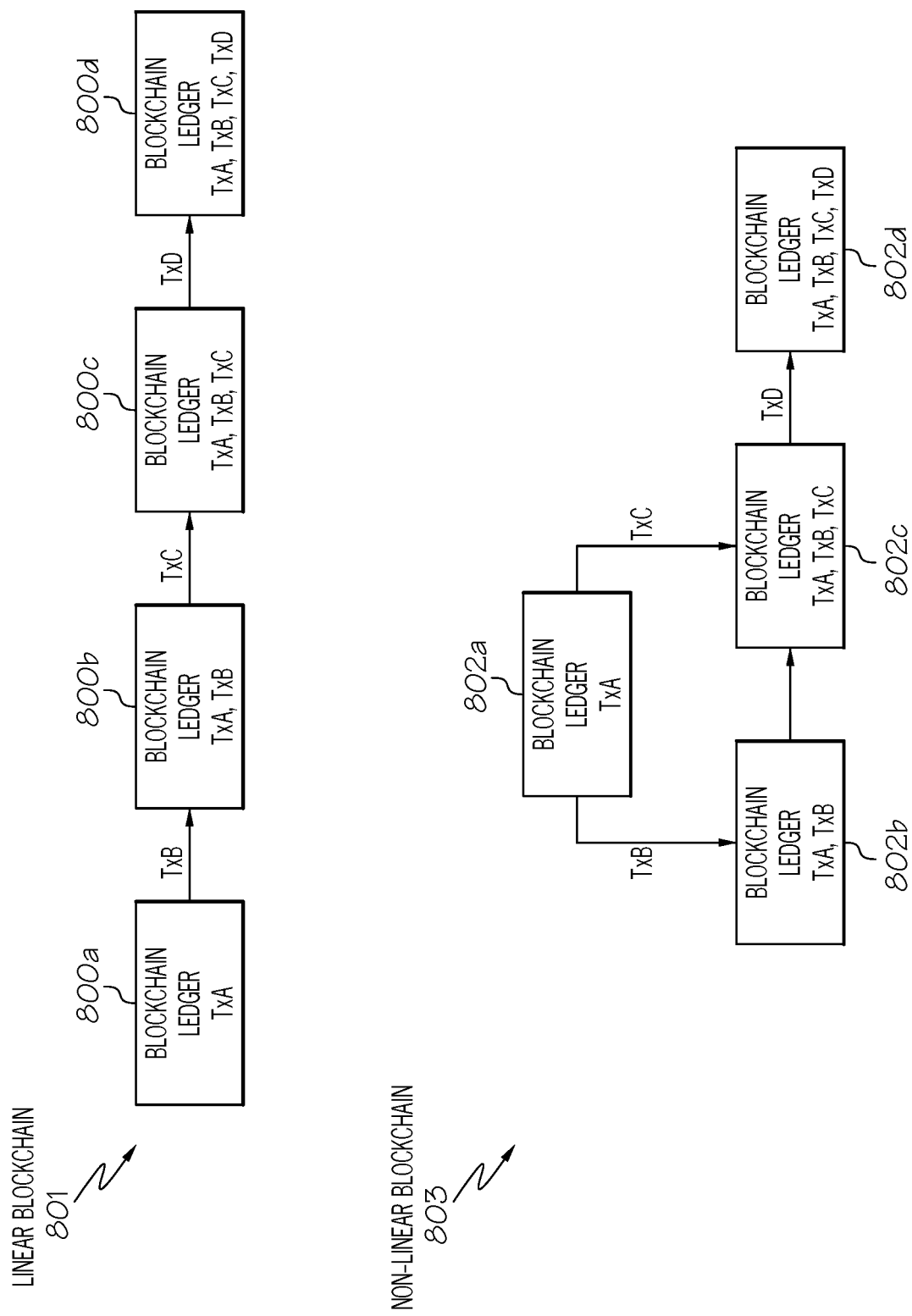
FIG. 8 illustrates blockchain processes as utilized in one or more embodiments of the present invention.

For example, consider FIG. 8.

As shown in FIG. 8, a linear blockchain 801 sequentially adds transactions to a blockchain ledger such that the blockchain ledger shows a linear/sequential record of input (s) and/or the output of a particular step in the process flow. For example, assume that blockchain ledger 800a (analogous to blockchain ledger 400 shown in FIG. 4) includes a step input (shown in block 404 in FIG. 4.) to a particular step in a process flow. This initial step input is shown in blockchain ledger 800a as the transaction TxA. If this input should be changed (e.g., as shown in FIG. 8 as transaction TxB), then the blockchain ledger 800a will be transformed into blockchain ledger 800b, which contains a record of both TxA and TxB in block 404. Similarly, a subsequent change to the input (transaction TxC) causes blockchain ledger 800b to change blockchain ledger 800c, which includes a record of transactions TxA, TxB, and TxC. Another subsequent change to the input (transaction TxD) causes blockchain ledger 800c to change blockchain ledger 800d, which includes a record of transactions TxA, TxB, TxC, and TxD. Similar and yet different transactions (not depicted) showing the resulting changes in the output from the particular step are also used to change the blockchain ledgers 800a-800d.

However, non-linear blockchain 803 allows blockchains to be generated in a non-linear "tree" manner.

For example, assume for purposes of illustration that transactions described for the inputs/outputs for a particular step in the process flow for linear blockchain 801 are the same transactions used in non-linear blockchain 803.

However, rather than having a linear/sequential record multiple transactions, such transactions are stored in different blockchain ledgers in a non-linear manner. As shown in the example in FIG. 8, blockchain ledger 802a contains a record of original transaction TxA, while blockchain ledger 802b contains a record of transactions TxA and TxB, blockchain ledger 802c contains a record of transactions TxA and TxC, and blockchain ledger 802d contains a record of transactions TxA, TxC, and TxD. While each of the blockchain ledgers 802a-802d contain different sets of transactions, they all include transaction TxA, which is from the originating blockchain ledger 802a that spawned all of the other blockchain ledgers 802b-802d. Thus, each of the blockchain ledgers 802b-802d include a record of the original parent blockchain ledger 802a, such that a trace can be made back to the originating/original blockchain ledgers 802a regardless of where/when the other blockchain ledgers 802b-802d came into the blockchain process.

In one or more embodiments of the present invention, the processor(s) confirm a transformation from the inputs to outputs for the steps in the process flow by validating a correctness of the transformation from the inputs to the outputs. A verifier then signs the transformation with a digital signature for the inputs and the outputs. That is, the processor(s) first check to ensure that what is output from a step in the process flow matches what is expected, based on what is input into that step. If so, then a verifier will sign the transformation with a digital signature that describes both the inputs and the outputs.

In one or more embodiments of the present invention, the chain of digital signatures is stored in a blockchain, and where the blockchain maintains a catalog of the IP blocks, where each of the IP blocks is protected by the chain of digital signatures. That is, a blockchain ledger, such as blockchain ledger 400, includes records not only of inputs and outputs and tests for a step, but also describes a catalog of IP blocks that are created by the process flow.

In one or more embodiments of the present invention, in which the chain of digital signatures is stored in a blockchain, and the method further includes the processor(s): auditing each step in the process flow; tracing each step in the process flow; validating each step in the process flow; verifying the chain of digital signatures; and, responsive to verifying the chain of digital signatures, storing the chain of digital signature in the blockchain. That is, the supervisory computer 301 shown in FIG. 3 audits each identified step in the process flow, traces the execution of each step in the process flow, and also validates (confirms) that each step in the process flow belongs therein. The processor(s) then verify the chain of digital signatures. Responsive to verifying the chain of digital signatures, the processor(s) store the chain of digital signature in the blockchain. That is, the chain of digital signatures for the steps in the process flow are verified as being correct (based on the underlying step description as well as the digital signature used to sign that underlying step), and are then stored in the blockchain.

In one or more embodiments of the present invention, the processor(s) store the blockchain in a library of process flows, and then store the library of process flows in a secure execution environment, such that the secure execution environment protects the library of process flows from other software on a system. That is, the library of process flows, which contains the blockchain of digital signatures, is stored in a secure execution environment, such as a protected/dedicated area of storage that is reserved for this library, or on a dedicated storage device (e.g., a dedicated hard drive) that is reserved for this library, etc.

In one or more embodiments of the present invention, the validating and the generating of the digital signature and the generating of the chain of digital signature is performed within a secure execution environment that protects a confidentiality and integrity of the validating and the generating of the digital signature and the generating of the chain of digital signature from other software on a system. In one or more embodiments of the present invention, this secure execution environment is a protected/dedicated processor and/or core that is reserved for this operation. For example, assume that a computer system has a 4 core processor. Assume further that one of the 4 cores is not committed to any particular operation. As such, this uncommitted core will be reserved for the operation of validating and generating the digital signature for the output of each of the steps and the hash/digital signature of the inputs to the steps in the process flow, as well as the generation of the chain of digital signatures for each of the steps in the process flow.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer readable storage device is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or from an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connects to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
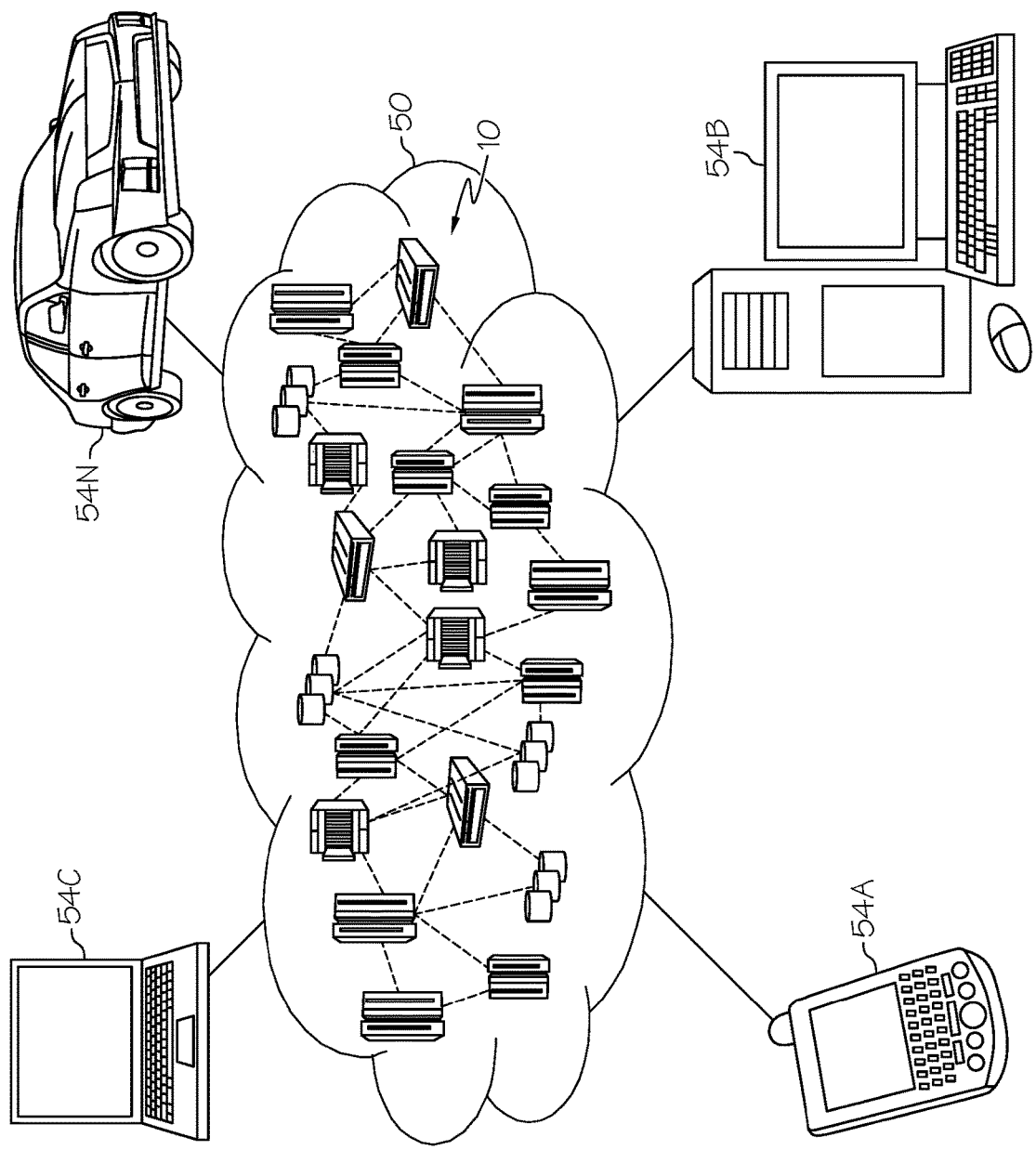
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
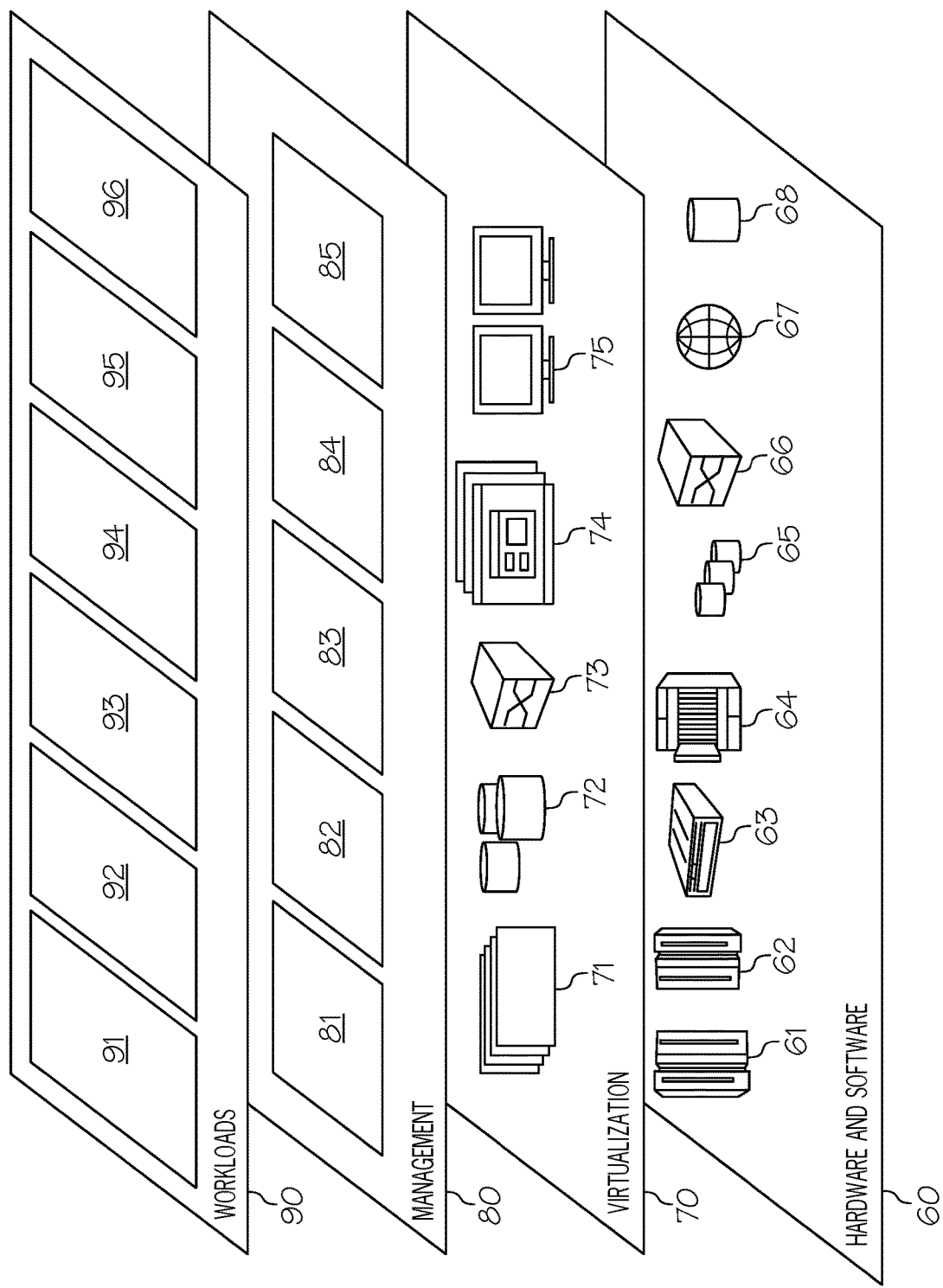
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and process flow management processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    validating, by one or more electronic processors, one or more inputs to one or more steps in a process flow by verifying at least one of a hash and a digital signature of each of the one or more inputs, wherein the process flow is a design flow for at least one intellectual property (IP) block in a semiconductor; and
    generating, by the one or more electronic processors, a digital signature for each step from the one or more steps in the process flow, wherein the digital signature covers an output of said each step and the one or more inputs to said each step, wherein the digital signature is incorporated into a chain of digital signatures that is used to verify the process flow, and wherein the chain of digital signatures comprises at least one of hashes and digital signatures of test data and test results of the at least one IP block.

2. The method of claim 1, further comprising:
utilizing, by the one or more electronic processors, the chain of digital signatures to verify a set of binary objects used in the process flow; and
using, by the one or more electronic processors, the set of binary objects in a manufacturing controller that creates a physical product.

3. The method of claim 1, wherein the process flow further comprises a manufacturing flow for the at least one intellectual property (IP) block in the semiconductor, and wherein the method further comprises:
loading, by the one or more electronic processors, the manufacturing flow into a computer-controlled manufacturing controller; and
directing, via a computer-controlled manufacturing controller, a wafer fabrication device to manufacture the semiconductor using the manufacturing flow.

4. The method of claim 1, wherein the hash and the digital signature of each of the one or more inputs describes a source of each of the one or more inputs, a description of each of the one or more inputs, and a unique identification of a tool used to create each of the one or more inputs.

5. The method of claim 4, wherein the tool is from a group consisting of a synthesis tool, a place and route tool, and an optical proximity correction tool used in a design of the at least one IP block in the semiconductor.

6. The method of claim 1, wherein the chain of digital signatures is added to a blockchain in order to provide an immutable record of the one or more inputs and the outputs of said each step.

7. The method of claim 1, wherein a previously produced output from a previous first step is used as an input to a subsequent second step in the process flow, and wherein a chain of digital signatures from a blockchain is used to verify the previously produced output.

8. The method of claim 1, further comprising:
storing, by the one or more electronic processors, the chain of digital signatures in a blockchain;
testing, by the one or more electronic processors, outputs of said each step in the process flow, wherein the testing determines whether said each step from the process flow performs a predefined function of said each step;
in response to the testing determining that a particular step from the process flow failed to perform the predefined function, implementing, by the one or more electronic processors, an adjustment to the particular failed step from the process flow until the particular failed step from the process flow performs the predefined function; and
storing, by the one or more electronic processors, the adjustment to the particular failed step in the blockchain.

9. The method of claim 8, further comprising:
training, by the one or more electronic processors, a neural network to identify a solution that cures a problem that caused the failed step from the process flow;
inputting, by the one or more electronic processors, a description of the failed step into the trained neural network; and implementing, by the one or more electronic processors, the solution identified by the neural network such that the failed step from the process flow performs the predefined function.

10. The method of claim 1, further comprising:
generating, by the one or more electronic processors, multiple blockchain transactions, wherein each blockchain transaction from the multiple blockchain transactions is for a particular step in the process flow, wherein said each blockchain transaction describes a change to at least one of the one or more inputs to each said particular step in the process flow, and wherein each blockchain transaction further describes a change to the output of each said particular step in the process flow; and
storing, by the one or more electronic processors, the multiple blockchain transactions in a non-linear blockchain that comprises multiple different pathways to an originating blockchain ledger for the particular step in the non-linear blockchain.

11. The method of claim 1, further comprising:
confirming, by the one or more electronic processors, a transformation from the inputs to outputs for the steps in the process flow by validating a correctness of the transformation from the inputs to the outputs; and
in response to confirming the transformation, signing, by a verifier, the transformation with a digital signature for the inputs and the outputs.

12. The method of claim 1, wherein the chain of digital signatures is stored in a blockchain, and wherein the blockchain maintains a catalog of the IP blocks.

13. The method of claim 1, wherein the chain of digital signatures is stored in a blockchain, and wherein the method further comprises:
auditing, by the one or more electronic processors, each step in the process flow;
tracing, by the one or more electronic processors, each step in the process flow;
validating, by the one or more electronic processors, each step in the process flow;
verifying, by the one or more electronic processors, the chain of digital signatures; and
responsive to verifying the chain of digital signatures, storing, by the one or more electronic processors, the chain of digital signature in the blockchain.

14. The method of claim 13, further comprising:
storing, by the one or more electronic processors, the blockchain in a library of process flows; and
storing, by the one or more electronic processors, the library of process flows in a secure execution environment, wherein the secure execution environment protects the library of process flows from other software on a system.

15. The method of claim 1, wherein the validating of the one or more inputs and the generating of the digital signatures are performed within a secure execution environment that protects a confidentiality and integrity of the validating of the one or more inputs and the generating of the digital signatures from other software on a system.

16. A method comprising:
validating, by one or more electronic processors, one or more inputs to one or more steps in a process flow by verifying at least one of a hash and a digital signature of each of the one or more inputs;
generating, by the one or more electronic processors, a digital signature for each step from the one or more steps in the process flow, wherein the digital signature covers an output of said each step and the one or more inputs to said each step, and wherein the digital signature is incorporated into a chain of digital signatures that is used to verify the process flow;

storing, by the one or more electronic processors, the chain of digital signatures in a blockchain;

testing, by the one or more electronic processors, outputs of said each step in the process flow, wherein the testing determines whether said each step from the process flow performs a predefined function of said each step;

in response to the testing determining that a particular step from the process flow failed to perform the predefined function, implementing, by the one or more electronic processors, an adjustment to the particular failed step from the process flow until the particular failed step from the process flow performs the predefined function; and storing, by the one or more electronic processors, the adjustment to the particular failed step in the blockchain.

17. The method of claim 16, further comprising:

training, by the one or more electronic processors, a neural network to identify a solution that cures a problem that caused the failed step from the process flow;

inputting, by the one or more electronic processors, a description of the failed step into the trained neural network; and implementing, by the one or more electronic processors, the solution identified by the neural network such that the failed step from the process flow performs the predefined function.

18. A method comprising:

validating, by one or more electronic processors, one or more inputs to one or more steps in a process flow by verifying at least one of a hash and a digital signature of each of the one or more inputs;

generating, by the one or more electronic processors, a digital signature for each step from the one or more steps in the process flow, wherein the digital signature covers an output of said each step and the one or more inputs to said each step, and wherein the digital signature is incorporated into a chain of digital signatures that is used to verify the process flow;

confirming, by the one or more electronic processors, a transformation from the inputs to outputs for the one or more steps in the process flow by validating a correctness of the transformation from the inputs to the outputs; and in response to confirming the transformation, signing, by a verifier, the transformation with a digital signature for the inputs and the outputs.

* * * * *